No. 754,159. PATENTED MAR. 8, 1904.
J. A. POTTER.
METHOD OF TREATING ORES, MATTES, &c.
APPLICATION FILED JULY 31, 1902.
NO MODEL.

WITNESSES
Warren W. Swartz
H. M. Corwin

INVENTOR
John A. Potter
by Bakewell & Byrnes
his attys

THE NORRIS PETERS CO., PHOTO-LITHO., WASHINGTON, D. C.

No. 754,159. Patented March 8, 1904.

UNITED STATES PATENT OFFICE.

JOHN A. POTTER, OF NEW YORK, N. Y.

METHOD OF TREATING ORES, MATTES, &c.

SPECIFICATION forming part of Letters Patent No. 754,159, dated March 8, 1904.

Application filed July 31, 1902. Serial No. 117,768. (No model.)

*To all whom it may concern:*

Be it known that I, JOHN A. POTTER, of New York, in the county and State of New York, have invented a new and useful Method of Treating Ores, Mattes, and Metallic Substances, of which the following is a full, clear, and exact description, reference being had to the accompanying drawings, forming part of this specification, in which—

Figure 1:
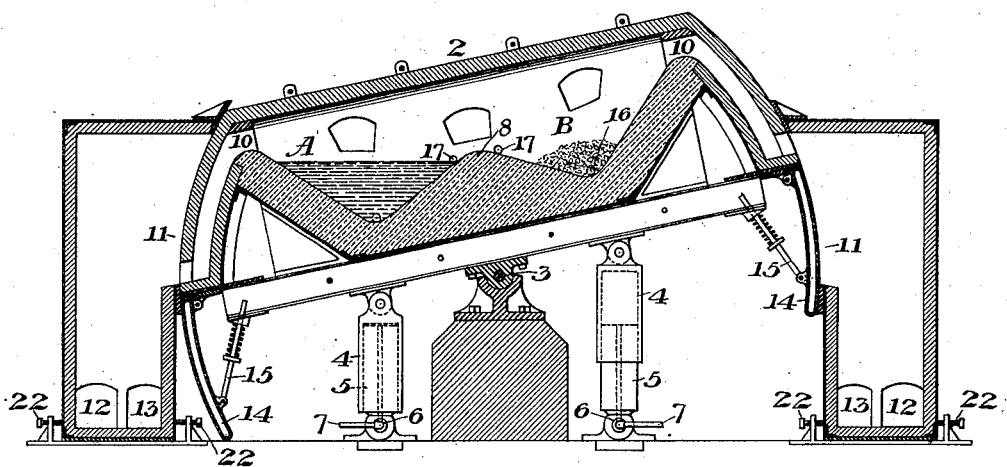
Figure 2:
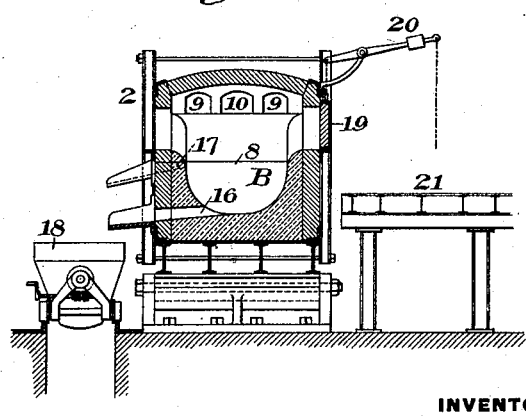

Figure 1 is a longitudinal section of a tilting furnace arranged for carrying out my process, and Fig. 2 is a vertical cross-section of the same.

My invention relates to the treating of ores, metals, mattes, &c., and is designed to provide a new and improved method whereby metals may be extracted from ores and mattes and wherein molten pig metal or iron may be treated preparatory to further treatment in an open hearth or other apparatus.

I will first describe my invention as applied to the obtaining of metallic substances from various ores or mattes, &c., such as those containing gold, silver, copper, lead, iron, &c., of which one or more may be present in varying proportions. In ores of this class it has been difficult to collect the small scattered particles of metal without the aid of a large liquid body of metal or matte which serves to attract and collect these particles. In my process I prepare and preheat the metal-bearing materials, and after they are heated to the proper temperature I subject them to the action of a body of molten metal or matte which will flow over, wash out, and gather together the separated particles of metal or matte present in the material.

Referring to the accompanying drawings, which show one form of apparatus for carrying out my invention, 2 is a tilting open-hearth furnace which may be mounted in any suitable manner, as upon trunnions 3, and tipped by means of pivoted cylinders 4, containing plungers 5, pivoted at 6 and having fluid-supply pipes 7. The furnace hearth or bottom is provided with two pockets A and B, separated by a central transverse ridge 8. I have shown this furnace as having air and gas flues 9 and 10 at each end, which extend downwardly and are provided with lower openings, which in all positions of the furnace register with the vertically-elongated ports 11 of air and gas flues 12 and 13, connected with the ordinary regenerators. To seal the ends of the ports 11, I provide at each end of the furnace a depending water-cooled sliding door or shield 14 of curved form, which may be connected by pivoted spring-supported links 15 with the furnace-bed, and thus act as yielding stops at either end. Each pocket is provided with tap-holes 16 and 17 at different levels, by which the slags, mattes, metals, &c., may be drawn off, either together or separately, into receiving-ladles, one of which is shown at 18.

19 represents doors which are normally held closed by the ordinary counterweight system 20, and 21 is the charging-floor.

22 represents adjusting-screws for the flues.

In operating this furnace with ores or mattes one of the pockets at the low side (shown at A) is provided with a large liquid body of molten metals or mattes, while the upper pocket B is charged with metal-bearing materials. These materials are heated in the position shown to the proper temperature, and the upper tap-hole of the pocket A is opened to allow the bath to be lowered to the level of this tap-hole by allowing the metals or slags to run out. This tap-hole is then closed and the furnace is slowly tilted, thus causing the liquid body of molten material in the pocket A to flow into and over the heated ores or materials in pocket B. After the furnace is thus tilted a small quantity of molten material is retained in pocket A, and fresh ores and materials are then placed in this pocket A, where they are in turn prepared and heated to the proper temperature. The upper tap-hole in pocket B is then opened and the surplus metal, mattes, and slag above this level are permitted to run out. This tap-hole is then closed, and the furnace is tilted back to its original position, the molten bath then flowing back into and over the heating materials of pocket A. These operations are repeated at any desirable intervals, the fresh ores and materials being fed to the upper pocket at each tilting of the furnace.

When smelting materials that do not contain lime, sulfur, or iron, I may add them to the charge, the lime being used to combine with the silica, &c., of the charge to form a slag, while the sulfur acts as a reducing agent and also unites with the iron to form a sulfurous iron matte, which matte has a strong attraction for the heated and formed metallic materials of the ore. The materials or combinations of metal and matte which will attract and amalgamate with the various metallic substances in the ores or mattes may be varied according to the particular ore or substance to be treated. Carbon may be used as a reducing agent for the oxygen, and a bath of liquid lead or lead and iron matte may be used as a dissolving agent. In the case of copper-bearing material carbon may be used as a reducing agent for the oxygen of the ore and a liquid-copper bath or a copper and iron matte as the dissolving medium.

If lead is to be extracted from the lead or copper bearing mattes, this may be carried out by using metallic iron or a mixture of iron ore and lime ground and mixed with sufficient carbon to consume the oxygen of the ore. This metal or mixture is placed in the upper pocket and bound and heated to a temperature where the carbon will combine with the oxygen, and the furnace then being tilted the liquid matte in the other pocket will flow over the iron or reduced iron ore and dissolve it. As the sulfur in the matte has a greater affinity for iron than for its lead, it will give up the lead and take up the iron to replace it. The lead thus set free accumulates at the bottom of the pocket, where it may be drawn off at the lower tap-holes.

An important feature of my invention lies in binding down the ores and materials to be smelted by using a small portion of the liquid bath left in the pocket as a binding material. This molten portion will congeal and bind or fasten the material to the sides and bottom of the pocket, thus holding them underneath the bath after tilting and preventing the ore charge from rising and floating on top of the bath, in which case the metallic constituents would be entangled with the slag and be lost. The charge of material put in the upper pocket is preferably stirred, mixed, and chilled with the small portion of the molten charge for this purpose. To accomplish this same result, the ores, &c., may be put in the upper pocket while empty and the furnace tilted sufficiently to allow a small portion of the bath to flow into this pocket and be mixed with the materials to congeal and fasten them therein.

An important use of my process is in preparing metal for the open-hearth steel process by removing the metalloids, as carbon, silicon, &c. In this case I place the pig metal or other metal to be treated in the lower pocket, either in a molten condition or cold, where it is heated to the desired temperature. While this heating is going on I place a mixture of finely-divided iron ore, carbon, and lime in the upper pocket, where this mixture is heated and prepared and bonded to the pocket, as above described. The furnace is then tilted, and the molten pig metal flows over and amalgamates with these materials, absorbing the iron, while at the same time the deleterious metalloids in the bath consume some of the oxygen of the ore and also combine with the lime, silicon, &c., to form the basic slag, thus purifying and rendering the bath low in metalloids, &c.

The furnace may be operated continuously after the first bath of metal has been put in the pocket, or it may be operated with fresh charges of liquid or cold metal after each tilting or after several tiltings. I may also use in the charge put in the upper pockets a mixture of metals and ores or metal-bearing materials—such as finely-divided borings, turnings, or slags containing metals—with which I may mix lime and carbon for carbonizing and fluxing purposes.

In applying my process to the extracting of iron from its ores I proceed in the following manner: The bottom of the furnace being composed of a basic material, as magnesite, &c., and the furnace heated to the proper working heat, I place in the low pocket a charge of cast-iron, where it is melted. During this time I place in the high pocket a layer of carbonaceous material mixed with ground lime and on top of this mixture a charge of iron ore, which is ground and mixed with carbon and lime, the carbon being employed to consume the oxygen contained in the ore while it is slowly heating to the point where the iron is formed and the lime being used to associate with the silica, &c., in forming a slag while the dissolving and melting action is taking place. The furnace is then tilted and new combinations are formed. The whole mixture and bath is liquid, and the layer of carbon and lime being set free from the bottom of the pocket rises up into and through the liquid bath, the carbon being absorbed by the liquid iron, which keeps it up to as high a percentage as it will absorb in carbon, thus maintaining its dissolving nature, while the lime associates with the silica, &c., in forming the slags.

The accumulated metals and slags are drawn off through the upper tap-holes before the furnace is tilted, thus making the process continuous in its operations.

The advantages of my invention result from the binding and preheating of materials in the upper pocket and the feeding thereon of a molten bath of attracting and dissolving materials; also, from the continuous operation, the heated gases serving to act upon the different charges in both pockets simultaneously. A cheap and simple method is thus afforded for treating metals, mattes, ores, &c.

Many variations may be made in the form and arrangement of the apparatus and the steps of the process without departing from my invention.

I claim—

1. The method of treating metal and metal-bearing materials, consisting in forming a molten metallic bath upon one portion of a furnace-hearth, preheating a separate charge of solid materials upon another portion of the furnace-hearth, pouring the molten bath over the solid material, preheating another charge of solid material upon that portion of the hearth from which the molten bath was poured, and then pouring said bath back upon said subsequent charge of solid material and so continuing; substantially as described.

2. The method of treating metals and metal-bearing materials, consisting in preheating a charge of solid material in a furnace-chamber, bonding the materials with a small portion of molten substance which becomes congealed and fastened to the solid materials, and then feeding the molten metallic bath onto such charge; substantially as described.

3. The method of treating metal and metal-bearing materials, consisting in forming a molten metallic bath in one cavity in a furnace-chamber, preheating a separate charge of solid materials in a second similar cavity in the same furnace-chamber, pouring the molten bath over the solid material in the second cavity and substantially emptying the cavity which contained the molten bath, preheating another charge of solid material in the cavity from which the molten bath was poured, and then pouring said bath back upon said subsequent charge of solid material, and so continuing; substantially as described.

4. The method of treating metals and metal-bearing materials, consisting in preheating a charge of solid materials in one cavity in a furnace-chamber, simultaneously heating a molten metallic bath in a separate cavity in the same furnace-chamber, pouring the molten bath over the solid material in the separate cavity and substantially emptying the cavity which contained said molten bath, feeding another charge of solid materials into the cavity just emptied, preheating said materials and again pouring the molten bath over said solid materials, and so continuing; substantially as described.

5. The method of treating metals and metal-bearing materials, consisting in forming a molten metallic bath in the lower pocket of a movable furnace-bed, simultaneously preheating a charge of solid material in an upper pocket of said movable bed in the same furnace-chamber, pouring the molten metallic bath over the solid charge by elevating and substantially emptying the pocket which contained said molten bath, and then placing a fresh charge of solid materials in the pocket just emptied, and repeating said operation; substantially as described.

6. The method of treating metals and metal-bearing materials, consisting in forming a molten metallic bath in one cavity in a furnace-chamber, preheating a separate charge of solid materials in another cavity of the same chamber, pouring the molten bath over the solid material and substantially emptying the cavity which contained the bath, tapping out from the combined mass a portion of the treated material, preheating another charge of solid material in the cavity from which the molten bath was poured and repeating the operation; substantially as described.

In testimony whereof I have hereunto set my hand.

JOHN A. POTTER.

Witnesses:
C. P. BYRNES,
H. M. CORWIN.